United States Patent [19]
Miller

[11] Patent Number: 5,604,890
[45] Date of Patent: Feb. 18, 1997

[54] COUPLING DEVICE FOR THE SWITCHING OF DATA LINES BETWEEN A DATA STORAGE DEVICE CONTROLLER AND A PLURALITY OF BOOTABLE DATA STORAGE DEVICES

[76] Inventor: Paul B. Miller, 1339 N. Wembley Cir., Port Orange, Fla. 32124

[21] Appl. No.: 290,586

[22] Filed: Aug. 16, 1994

[51] Int. Cl.$^6$ ................................................ G06F 9/455
[52] U.S. Cl. .......................................... 395/500; 395/825
[58] Field of Search ................................. 395/500, 700, 395/600, 650, 280, 821

[56] References Cited

U.S. PATENT DOCUMENTS

| | | | |
|---|---|---|---|
| 3,440,612 | 4/1969 | Womack | 340/172.5 |
| 4,493,034 | 1/1985 | Angelle et al. | 364/200 |
| 4,530,052 | 7/1985 | King et al. | 364/200 |
| 4,626,986 | 12/1986 | Mori | 364/222.2 |
| 4,675,814 | 6/1987 | Murai et al. | 364/231.06 |
| 4,823,257 | 4/1989 | Tonomura | 364/200 |
| 4,905,141 | 2/1990 | Brenza | 395/456 |
| 5,107,489 | 4/1992 | Brown et al. | 370/58.2 |
| 5,134,580 | 7/1992 | Bertram et al. | 395/650 |
| 5,136,709 | 8/1992 | Shirakabe et al. | 395/700 |
| 5,278,973 | 1/1994 | O'Brian et al. | 395/500 |
| 5,291,599 | 3/1994 | Cohen et al. | 395/700 |
| 5,414,851 | 5/1995 | Brice, Jr. et al. | 395/650 |
| 5,452,455 | 9/1995 | Brown et al. | 395/700 |
| 5,454,110 | 9/1995 | Kannan et al. | 395/600 |
| 5,465,359 | 11/1995 | Allen et al. | 395/700 |
| 5,483,647 | 1/1996 | Yu et al. | 395/500 |
| 5,485,579 | 1/1996 | Hitz et al. | 395/200.12 |

*Primary Examiner*—Kevin J. Teska
*Assistant Examiner*—Tan Q. Nguyen
*Attorney, Agent, or Firm*—LaRiviere, Grubman & Payne

[57] ABSTRACT

A custom switching circuit board which is installed into a personal computer allowing the user to upgrade his or her computer to a multiple operating system computer. The custom switching circuit board allows switching of a plurality of bootable hard disks, each with the capability of running one operating system. A key switch is provided for switching to each of the system positions and the key is removable in all positions.

12 Claims, 4 Drawing Sheets

COUPLING DEVICE FOR THE SWITCHING OF DATA LINES BETWEEN A DATA STORAGE DEVICE CONTROLLER AND A PLURALITY OF BOOTABLE DATA STORAGE DEVICES

BACKGROUND OF THE INVENTION

1. Field of the Invention

This invention relates to the initialization of the personal computer and more specifically relates to multiple bootable hard disks which are switched by adding a custom switching circuit board easily installed in the personal computer, thus permitting the user to upgrade their computer to a multiple operating system computer.

2. Description of the Prior Art

It is common in initialization of the personal computer or PC computer to bring up an operating system, such as Microsoft Disk Operating System (DOS), so that upon turning on the computer the system initialization includes loading DOS and eventually providing a "DOS prompt" on the screen for interaction. Typically, the user will have selected the operating system he or she will be using and will insert a DOS diskette into a floppy diskette drive, or A drive, so that the initialization process or boot up of the computer can take place. Once the initialization has taken place and the DOS prompt has appeared on the screen of the monitor, the user can then choose which application software he or she wishes to use and load that software into the computer by way of removing the DOS diskette from the A Drive, inserting the software diskette chosen into the A drive and typing in the filename of the program into the computer.

Because of the tediousness of insertion and removal of the diskettes into the A drive, a hard disk or C hard disk was invented that would allow the user to place his selected operating system onto the hard disk so that the operator need only turn on the computer to have it boot up. No DOS diskette needed to be inserted into the A drive because the hard disk or C hard disk already contained the DOS system, or chosen operating system. In addition to this benefit of using a hard disk, the user could also install his application software onto the same hard disk in subdirectories, allowing the user to copy most, if not all, of his application software onto the hard disk. This, as it turned out, saved the user considerable time not having to load and remove floppies from the A drive while using the computer. Additionally, another hard disk or D drive was added to the existing computer to expand the size of the C drive. The computer did not boot from the D drive; the D drive only gave the user added space to store more of their software.

Unfortunately, if the user wished to run another operating system on his or her computer, he or she either had to erase the old operating system and software from his or her hard disk and load the new operating system onto it or boot the new operating system with the A Drive and then load his or her new software via the A Drive as well. This put the user in the same position of having to load everything from the A drive as described above.

Because of this problem, one operating system emerged as the leading operating system in the market place: the Microsoft DOS Operating System. Although other operating systems have been invented, none of them shares the same success as the DOS operating system. Most application software available from software retailers for the PC computer, operate on the DOS operating system. It is common to find most, if not all PC computers using a hard disk with the DOS operating system installed on it. Though other operating systems can be installed on the hard disk, most of the PC computers using a hard disk use the DOS operating system.

Now, personal computer hardware and newer, faster processor chips have advanced far beyond the DOS operating system that was originally designed for the P.C. computers. While many operating systems have been designed to replace the DOS operating system, every attempt has been met with resistance from the personal computer user. Most people that own a personal computer system have spent hundreds and thousands of dollars for software that runs on the DOS operating system. While new operating systems may be faster and provide operations that DOS was never intended to perform, no one is willing to throw their supply of software away so that they may run on a faster, new operating system.

Microsoft, the original manufacture of the DOS operating system, and IBM Corp. joined together to manufacture OS/2 ver 2.0 operating system, which was intended to replace the slower DOS operating system. The problem with the OS/2 operating system is that a user had to divide his or her hard disk into multiple operating system partitions which greatly reduces their capacity to store data on their hard disks. Users in general found that installation of the OS/2 operating system was hard to perform and that the OS/2 operating system only allowed you to run other versions of OS/2 or Dos or Windows. Also DOS and Windows application software did not always perform well while running on OS/2. Because of this problem, software manufacturers were reluctant to spend their time and money developing new software to support the OS/2 operating system. Although some software has been developed for the faster OS/2 operating system, most software manufacturers are not willing to jeopardize their DOS operating system market by developing new software to support OS/2, a system to which the majority of users are not willing to switch to.

Recognizing this, other individuals and companies have been developing ways to combat this problem, as the need for a newer and faster operating system is growing in the computer market. It is essential, in order to advance computer technology that the operating system be able to advance with it. There is a need every few years to be able to update or create a new, more powerful operating system as computer technology advances, without having to provide support for the older, slower operating systems and without affecting the users need to maintain these older operating systems and software. The answer to this problem is not a new operating system that can provide some compatibility for the DOS software. The answer is a multiple operating system computer that allows the operating systems to coexist within the computer and allow any and all operating systems to run independent from each other. It has been stated in P.C. Computing Magazine, February, 1994, issue that in 32 bit operating systems: Compatibility is key. This is not the case.

On Jan. 8, 1985 a Patent was granted, Angelle et al, U.S. Pat. No. 4,493,034, the assignee was Honeywell Information Systems Inc. Honeywell developed a Data Processing System that could supervise a plurality of operating systems for the consumers use. On Jul. 16, 1985 a patent was granted to Honeywell Information Systems, King et al, U.S. Pat. No. 4,530,052, on another Data Processing System that shared a plurality of operating systems. On Jul. 28, 1992 a patent was granted to IBM, Bertram et al, U.S. Pat. No. 5,134,580, in which a personal computer was modified or developed to allow a choice of two operating systems to the user without the need to shut down the equipment. Other Patents include Shirakabe et al, U.S. Pat. No. 5,136,709, O'Brien et al, U.S. Pat. No. 5,278,973, and. K. K. Womack, U.S. Pat. No. 3,440,612.

In all of the above patents, new computers were developed to provide for a plurality of operating systems at a large expense to the consumer, most of these computers being data processing or mainframe computers. One computer U.S. Pat. No. 5,134,580 Bertram et al, assignee IBM Corp. designed and patented a modified personal computer to run two different operating systems. The problem with this approach, at least in the short term, is that the user would have to buy a new and expensive computer to replace his old computer. Users will find it just as hard to throw away their expensive computers as they did with their expensive DOS software, just to run on a faster and better operating system. Another problem with this system is that it does not provide storage space for both operating systems to store their separate software on hard disks and in subdirectories, or in large amounts.

Though most consumers, if the equipment was able, would probably prefer to run on a newer and faster operating system and to buy software for that system, they could not afford the cost to replace all their existing software that currently runs on the DOS operating system, or the cost of replacing their computer equipment by buying a multiple operating system computer. The solution is to provide a printed circuit board card that is easily installed into their existing computer, allowing them to upgrade to a multiple system computer at a small cost.

SUMMARY OF THE INVENTION

This invention relates to the computer system in which the user is able to select, before turning on the computer, the desired operating system of choice by the operation of actuating means, in this case, by turning a key switch mounted on the front of the computer cabinet to the desired system, and then turning on the computer to boot the equipment. This is done by installing a custom electronic switching circuit board, or (I.O.S.) Independent Operating Systems circuit board, into the computer and mounting an electronic switch or key switch onto the front of the computer or replacing the keyboard lock switch with the new key switch, the key switch being a key switch which locks out all but the selected system to be run, with an off position to lock out all systems, and a key that is removable in all positions.

When the user switches the key switch to system 1 position he can then install any one operating system and its application software onto the system one C hard disk. Accordingly, the user can then switch the key switch to system 2 and install another operating system onto the system two C hard disk. Again, the user can select yet another position, system 3 and install another operating system onto the system three C hard disk and so on. Note: one hard disk is required for each system desired. The I.O.S. circuit board can handle from 1 to 3 system C hard disks, but by adding yet another I.O.S. circuit board, or more, the number of system C hard disks is only restricted by the size of the computer cabinets capacity to hold the hard disks or by the number of electronic slots needed to insert the I.O.S. circuit boards. Additionally for every system C hard disk added to the system the user may still add a D hard disk, still allowing the user to expand his software storage requirements.

The I.O.S. circuit board does have a requirement if the user is using different types of hard disks. In the normal setup and installation of a hard disk, the user must setup the CMOS configuration and select, or type, the type of hard disk being used. He does this by typing in the amount of cylinders, heads, and sectors that the drive has. The CMOS then passes this information to the computer system each time the system is booted. If the user is using different types of hard disks with the I.O.S. circuit board, he must purchase an auto configuration hard disk controller board (prior art) to replace his existing hard disk controller card. The auto configuration hard disk controller card allows the user to set the CMOS to type one for all of the hard disks. When the computer is booted, the auto configuration hard disk controller card tells the computer what type of hard disk is installed, instead of the CMOS. The card does this by checking to see what hard disks are connected to the computer when initialization begins and then passes that information to the computer. Note: This auto configuration hard disk controller card need only be installed for an IDE hard disk and IDE controller. It is not necessary to use an auto configuration hard disk controller card if the user is using the same type hard disks.

This circuit does not effect the normal computer operation in any way. When a given system C hard disk is selected, the other system C hard disks are electronically disconnected thereby making it impossible for them to affect each other. The key switch allows the user to select a given system C hard disk and remove the key as to prevent anyone from entering any other system C hard disk. This can provide security for small businesses that may have their financial software on a separate system C hard disk and want to lock anyone from entering that system C hard disk, etc. Also the key switch has an off position that, when selected, electronically disconnects all system C hard disks from the computer, preventing the use of any of the systems.

The I.O.S. circuit board can also take many forms such as being added to an existing central processing unit board, or mother board, or added to any of the existing boards such as the hard disk controller board, serial/parallel I/O board, monitor card, or any now or future printed circuit boards or electronic part that can be added to the PC computer. The I.O.S. circuit board can also be adapted to other types of PC computers such as the Apple computers. The electronics in the I.O.S. circuit board that is used to switch the hard disk circuits can also take many forms and could be easily adapted to future electronic circuitry.

The I.O.S. circuit board was designed to run a plurality of operating systems independent of each other on their PC computers, but this circuitry can also be used to allow more then one user to operate their own system hard disk and lock the other users out of his or her system. An example of this is where a company may run three shifts and wants a separate system for each shift. The supervisors would at the beginning of each shift switch to the system for that shift, for example, Shift 1 runs on System One C Hard Disk, shift 2 runs on System Two C Hard Disk and so on, guaranteeing the users that no one will be allowed access to their work, except the supervisors. In this way no one can erase, access or modify the users files from any other shift.

Another use for this circuit would be if a small business had only one computer and needed to keep others from accessing important or sensitive information like their payroll or employee records. The office personnel may need to use the computer for their word processing and the engineering personnel may need to use the computer for their technical work. With this system the manager of the company could lock out the companies personnel and financial files and the engineering technical files while the office personnel use the computer, and visa vera.

This system was not intended to be used as a mirrored backup system, a mirrored system being a backup system in case the main system should fail, but it does have some of it's capabilities.

With the I.O.S. circuit board installed in the users computer, the user would be able to run on a new operating system and buy software for that new operating system, without being concerned about compatibility with their existing DOS operating system. The user would still be able to maintain his DOS operating system and software separate from the new system. When the user decides to upgrade his software as the need arises, he could then purchase the upgrade for the new operating system. As time goes by the user could upgrade all his or her DOS software to the new operating system and phase out the old DOS operating system as his or her primary operating system. This will then allow the computer market to change or replace old operating system as the need arises without concern for making them compatible with the old systems. The need of the user to maintain there existing operating system is then put in the hands of the user and not the operating system manufacturer. The cost of the I.O.S. circuit board being relatively small, this would seem to be a fair and reasonable solution to a growing problem surrounding the operating system market.

With the I.O.S. circuit board available in the market place, the possibilities for specialized operating systems could appear in the computer market. An example would be: an operating system designed specifically for game software in which cartoon animation similar to television cartoons could be made. Amiga computers designed their computers for graphics and had some amazing animated games. Another example could be an operating system for the engineering field, and still another could be for data bases applications. The possibility for the computer industry for these types of operating systems can only come if users can select and run any operating system on the market, or select what systems they would like to run and keep their other systems as well. The need for a inexpensive upgrade to a multiple operating system computer is here and the need to replace the DOS operating systems has been here for many years.

BRIEF DESCRIPTION OF THE DRAWINGS

This invention is set forth in detail below with reference to the attached drawings, a brief description of which follows.

DETAILED DESCRIPTION

Figure 1:
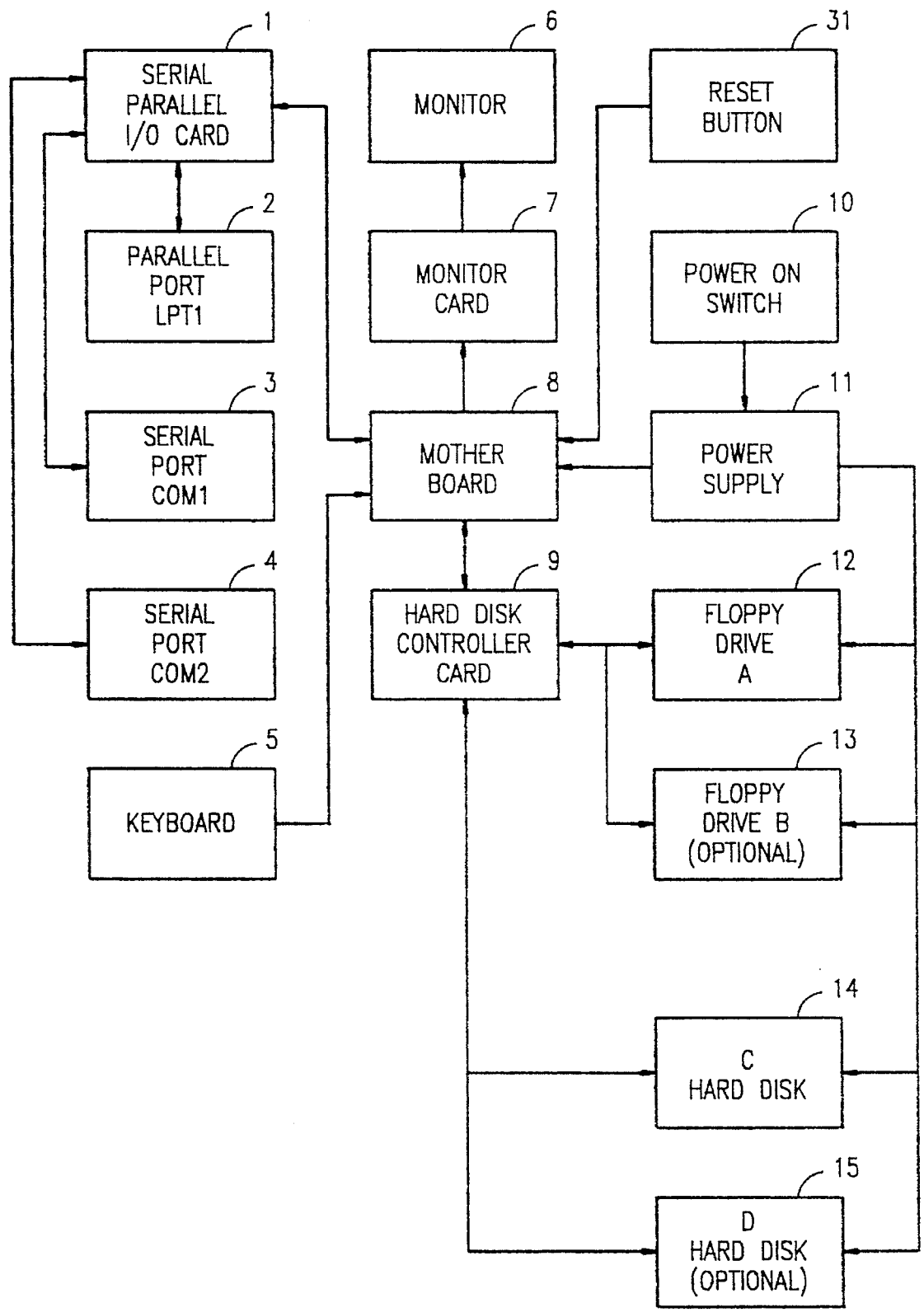
FIG. 1 (PRIOR ART), is a flow chart which illustrates the major elements of a personal computer system and it's functions.

FIG. 1 (PRIOR ART), illustrates a typical configuration of a personal computer system, the major elements and it's functions.

When the power on switch 10 is activated, the power supply 11 provides +5 volts, +12 volts, 12 volts ground, or AGND and 5 volts ground, or DGND to the mother board 8, the Floppy Drive A, 12, the Floppy Drive B, 13, Hard Disks, C 14 and D 15., and through Mother Board 8 to Serial/Parallel I/O Card 1, Monitor Card 7, Keyboard 5, and other possible add-on cards that can be inserted into the personal computer. The computer initialization takes place and the computer searches the Floppy Drive A, 12 for a floppy diskette with boot information and the operating system. If not found in the Floppy Drive A, 12, the C Hard Disk 14 is then accessed to see if the boot information and the operating system is present there. When this information and the operating system are found the system will boot up and provide a prompt on the Monitor 6, by way of the Monitor Card 7, for interaction by the user. Interaction can then take place by a number of different means. One way for the user to interact with the system is by typing instructions with the Keyboard, 5. Another way would be if a mouse pointing device was hooked up to either Serial Port Com1, 3 or Serial Port Com2, 4 with data transfer provided by the Serial/Parallel I/O Card 1. Still another way would be if a modem were connected to Serial Port Com1, 3 or Serial Port Com2, 4 with data transfer provided by Serial/Parallel I/O Card 1.

Figure 2:
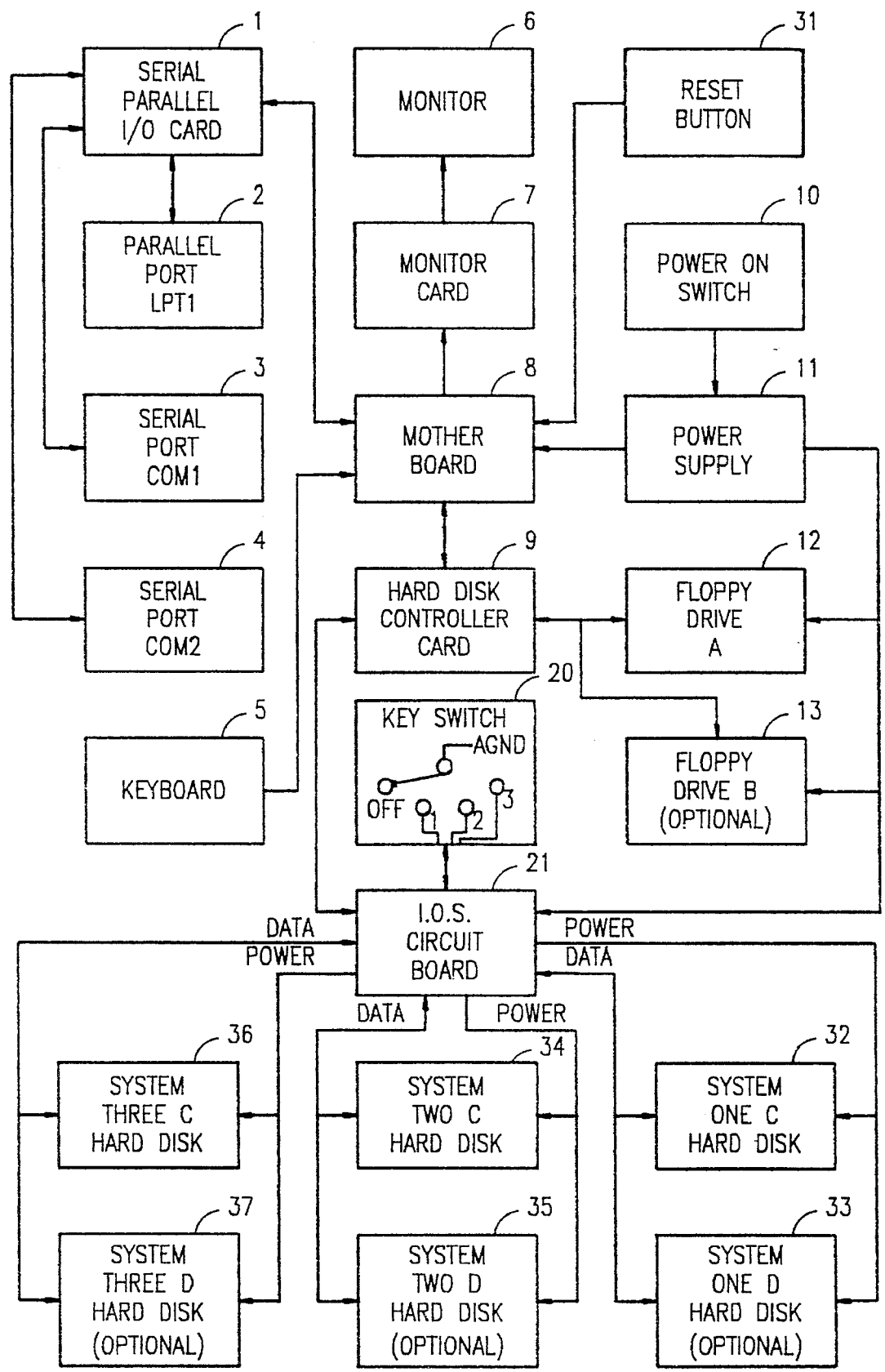
FIG. 2 is a flow chart which illustrates the major elements of a personal computer system with the I.O.S. circuit board installed and their related functions.

FIG. 2 illustrates a Personal Computer System with the I.O.S. Circuit Board installed, its major elements and their related functions.

The Key Switch 20 has four positions in which the switch can be turned: OFF, 1, 2, and 3. Each position, with the exception of the OFF position, will select a separate system C hard disk with its own boot information, operating system and related software. See item 32 & 33, 34 & 35, and 36 & 37. Items 33, 35, and 37 are optional D hard disks for each of the three operating system C hard disks and are used to expand the size of each of the operating system storage capability.

It can be seen from the interconnection of the components in FIG. 2 that the circuit board 21 provides first circuit means for connecting the data lines from the hard disk controller 9 to the circuit board 21 and then to the system one, two and three switching circuits, and also for connecting power lines from the computer power supply 11 to the circuit board 21. It can also be seen from the interconnection of the components in FIG. 2 that the circuit board 21 provides second circuit means for connecting the data lines from the hard disks 32 to 37 to the circuit board 21 and to the system one, two and three switching circuits, and also for connecting power lines from the hard disks 32 to 37 to the circuit board 21.

FIG. 2 circuit functions as follows: Before turning on the computer the user will decide which operating systems is needed and on which Key Switch 20 position it resides. In this example we will start with Key Switch 20 position 1. The user will turn the Key Switch 20 to position 1 and then turn the Power On Switch 10 to the on position. The computer system is then supplied power from the Power Supply 11 to the Floppy Drive A, 12, Floppy Drive B, 13, the I.O.S. Circuit Board 21 and the Mother Board 8. The Mother Board 8 then supplies power thru its eight, sixteen, and thirty two bit card edge connector slots to any other cards that may be plugged into the Mother Board 8, for example, the Serial/Parallel I/O Card 1 is supplied power from an eight bit card edge connector on the. Mother Board 8. The Mother Board 8 also supplies power to the Keyboard 5 by way of a small connector mounted on the back of the Mother Board 8.

With the power now on, the computer begins its initialization and first searches the Floppy Drive A, 12 to see if any floppy diskette with the boot up information and operating system is inserted into the Floppy Drive A, 12. If a floppy diskette is found in the Floppy Drive A, 12 that contains the boot information and operating system on it, the computer system will boot from the Floppy Drive A, 12 and a prompt will appear on the Monitor 6 via the Monitor Card 7 for interaction by the user. If no floppy diskette with the Boot information and operating system is found in the Floppy Drive A, 12, the computer system next looks to the Key Switch 20 selected C hard disk for boot information and operating system. When the Key Switch 20 is in position 1 the I.O.S. Circuit Board 21 selects the System One C Hard Disk 32 and System One D Hard Disk 33, (optional) for use. The computer system looks at the System One C Hard Disk 32 and upon finding the boot information and operating system then finishes the boot sequence and provides a prompt on the Monitor 6 via the Monitor Card 7 for interaction by the user.

After interaction by the user is completed the user may either turn off the computer system via Power On Switch 10 or select another Key Switch 20 position and run yet another operating system. If the user decides to turn off the computer system he may either turn the Key Switch 20 to the OFF position and then turn off the computer using the Power On Switch 10, or he can leave the Key Switch 20 in the preselected position for future use and turn off the computer system via the Power On Switch 10.

If the user decides to run another operating system, he will turn the Key Switch 20 to another position, for example, position 2. With position 2 selected on Key Switch 20 the I.O.S. Circuit Board 21 selects System Two C Hard Disk 34 and System Two D Hard Disk 35, (optional), for operation. Since the computer system power is still on, the user need only push the Reset Button 31 mounted on the front of the computer system to begin a new initialization.

Initialization takes place again as described above except that instead of System One C Hard Disk 32 and System One D Hard Disk 33, (optional), being selected, the I.O.S. Circuit Board 21 now has selected the System Two C Hard Disk 34 and System Two D Hard Disk 35, (optional), land its operating system for interaction by the user.

If the user decides to run yet another operating system. He will turn the Key Switch 20 to another position, for example, position 3 and push the reset button 31. The I.O.S. Circuit Board 21 selects the System Three C Hard Disk 36 and System Three D Hard Disk 37, (optional), and its operating system for interaction by the user as described above.

If more operating systems are required, the user may add another I.O.S. Circuit Board 21 and parallel the cables from the Hard Disk Controller Card 9 and Power Supply 11 to the first I.O.S. Circuit Board 21 and to the second I.O.S. Circuit Board 21. The user will then replace the Key Switch 20 with a new Key Switch 20 that has 7 positions instead of 3 positions. The 7 positions being Off, 1, 2, 3, 4, 5, and 6. More I.O.S. Circuit Boards 21 may be added with the only restriction being the amount of card edge connector slots in the Mother Board 8 and room in the computer cabinet for system C hard disks.

The key of the Key Switch 20 can be removed in all of its positions as to allow the user to lock in only one system at a time if desired. This will prevent anyone from entering any other system without the key to Key Switch 20. The key of Key Switch 20 can also be removed in the OFF position to disallow use of all operating systems.

When the Key Switch 20 is in any one position the other systems or positions are electrically disconnected from the computer system. In the OFF position of Key Switch 20 or when the computer is powered off all of the positions or system C hard disks are electrically disconnected. This will prevent anyone from damaging data on the system C or D hard disks or possible damage incurred by fluctuations in the AC line voltage.

A power on reset circuit exists on the Mother Board 8 which could be incorporated into future I.O.S. Circuit Boards 21 so that when the user switches to another position on the Key Switch 20, instead of having to push the Reset Button 31 on the front of the computer system, the Key Switch 20 could provide a temporary ground to be sent to the Mother Board 8 power on reset circuit causing the computer system to automatically reset when Key Switch 20 is turned.

Figure 3:
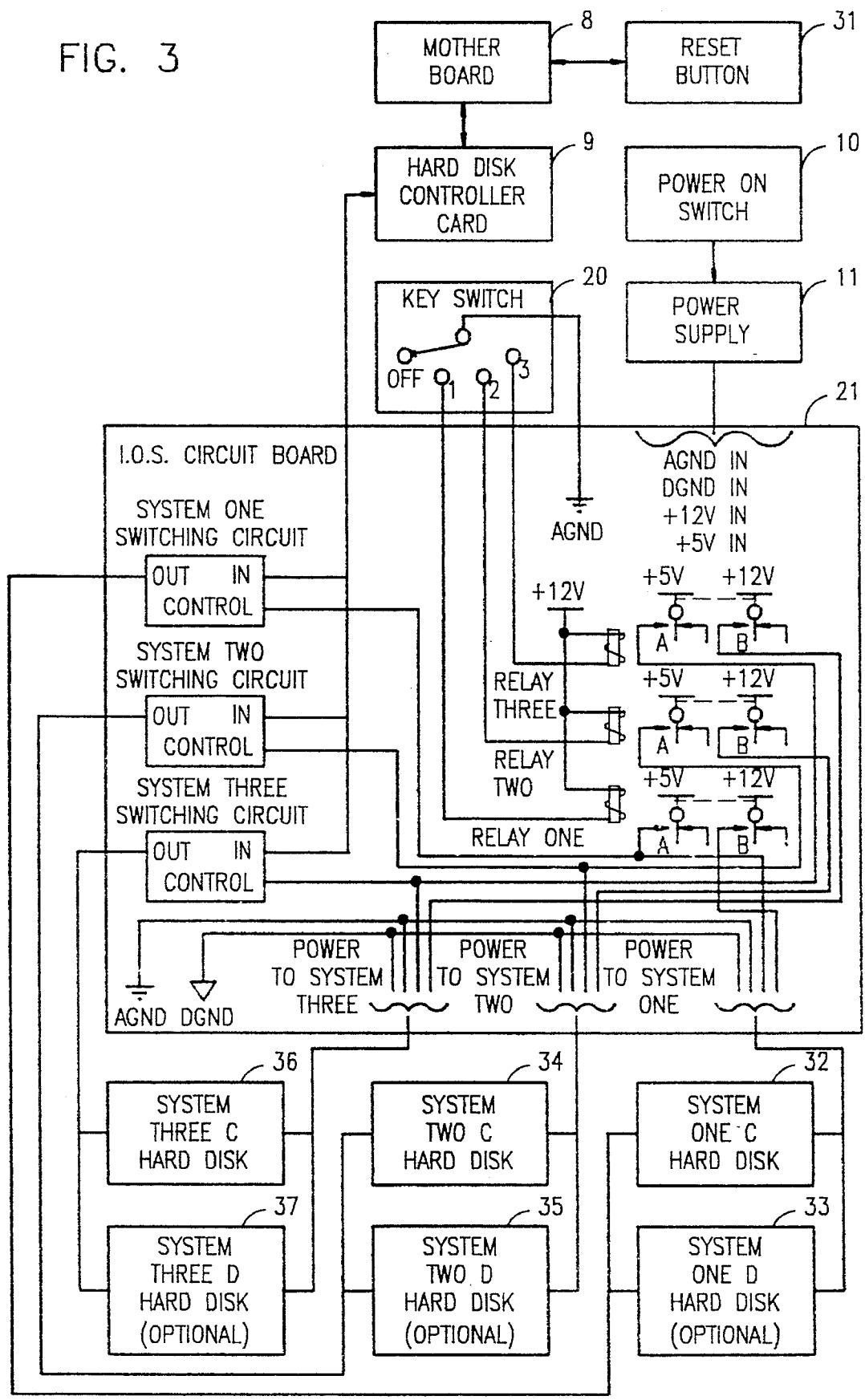
FIG. 3 is a flow chart which illustrates a personal computer configuration with the I.O.S. circuit board installed and provides a more detailed description of the I.O.S. circuit board's functions.

FIG. 3. Installation of the I.O.S. Circuit Board 21 is as follows: The I.O.S. Circuit Board 21 is plugged into one of the eight, sixteen or thirty two bit card edge connector slots mounted on the Mother Board 8. In FIG. 1 the data cable from the Hard Disk Controller Card 9 is connected to the C Hard Disk 14 and D Hard Disk 15, (optional). In FIG. 3 the data cable from the Hard Disk Controller Card 9 is rerouted to the I.O.S. Circuit Board 21. The power supply cable in FIG. 1 that is connected to the C Hard Disk 14 and D Hard Disk 15, (optional), is also rerouted in FIG. 3 to the I.O.S. Circuit Board 21. On the I.O.S. Circuit Board 21 in FIG. 3 the data cable from the Hard Disk controller Card 9 is parallelled to three switching circuits, System One Switching Circuit, System. Two Switching Circuit, and System Three Switching Circuit. Each of these switching circuits has a control line which is activated by applying +5 V to the control line thus allowing connection between the in and out lines of the switching device. From the out side of the System One Switching Circuit is a data cable connected to the System One C Hard Disk 32 and System One D Hard Disk 33, (optional). From the out side of System Two Switching Circuit is another data cable to System Two C Hard Disk 34 and System Two D Hard Disk 35, (optional). From the out side of System Three Switching Circuit is still another data cable connected to System Three C Hard Disk 36 and System Three D Hard Disk 37, (optional). Power to System One C Hard Disk 32 and System One D Hard Disk 33, (optional), is supplied from the I.O.S. Circuit Board 21 from a connector marked Power to System One. Power to System Two C Hard Disk 34 and System Two D Hard Disk 35, (optional), is supplied from the I.O.S. Circuit Board 21 from a connector marked Power to System Two. Power to System Three C Hard Disk 36 and System Three D Hard Disk 37, (optional), is supplied from the I.O.S. Circuit Board 21 from a connector marked Power to System Three.

FIG. 3 illustrates a flow chart in which the I.O.S. Circuit Board 21 is shown in detail.

As described previously above before turning on the computer system the user will select the operating system of choice by turning the Key Switch 20 to one of three positions for a single I.O.S. Circuit Board 21 configuration or six positions for dual I.O.S. Circuit Boards 21 and so on, for any number of systems required in multiples of three. After selecting a system, for example position 1 of Key Switch 20, Analog Ground or AGND is supplied to the I.O.S. Circuit Board 21 via position 1 of the Key Switch 20. The AGND from position 1 of the Key Switch 20 is applied to one side of the coil of Relay One on the I.O.S. Circuit Board 21. Then the user applies power to the computer system by turning on the Power On Switch 10. Relay One on the I.O.S. Circuit Board 21 is then supplied +12 V on the other side of its coil energizing Relay One. 5 V is supplied via contact A of Relay One to the Control line of System One Switching Circuit which allows continuity between the In and Out of the System One Switching Circuit. Note: The System One Switching Circuit, System Two Switching Circuit, and System Three Switching Circuit represent a conglomerate of analog switching devices, each with its their individual Ins, Outs and Control lines. An example of this is an IDE controller card and IDE hard disk in which there are forty data lines in the Data Cable. Forty data lines requires forty switching devices per system switching circuits. System One Switching Circuit, System Two Switching Circuit, and System Three Switching Circuit would all require forty switching devices each.

For simplicity all switch circuits are represented as a single switching device as not all hard disks on the market use the same amount of data lines.

When Relay One of the I.O.S. Circuit Board 21 is energized and the System One Switching Circuit is activated by applying +5 V to the Control line from contact A of Relay One, System One Switching Circuit makes connection between the Hard Disk Controller Card 9 and the System One C Hard Disk 32 and System One D Hard Disk 33, (optional). +5 V is also supplied via Relay One contact A to a connector on the I.O.S. Circuit Board 21 marked: Power to System One. A power cable runs from this connector to the System One C Hard Disk 32 and System One D Hard Disk 33, (optional). +12 V is supplied thru Relay One contact B to the Power to System One connector. The initialization process can then take place and boot information and the operating system from System One C Hard Disk 32 will boot the computer system for user interaction.

When the user decides to initialize another operating system, in this case system two, he will turn the Key Switch 20 to position 2 and press the Reset Button 31 on the front of the computer system. AGND is then applied via position 2 of the Key Switch 20 to Relay Two on the I.O.S. Circuit Board 21. Because the power to the computer is still on, Relay Two on the I.O.S. Circuit Board 21 energizes. When Relay Two of the I.O.S. Circuit Board 21 is energized and the System Two Switching Circuit is activated by applying +5 V to the Control line from contact A of Relay Two. System Two Switching Circuit makes connection between the Hard Disk Controller Card 9 and the System Two C Hard Disk 34 and System Two D Hard Disk 35, (optional). +5 V is also supplied via Relay Two contact A to a connector on the I.O.S. Circuit Board 21 marked: Power to System Two. A power cable runs from this connector to the System Two C Hard Disk 34 and System Two D Hard Disk 35, (optional). +12 V is supplied thru Relay Two contact B to the Power to System Two connector. The initialization process can then take place and boot information and the operating system from System Two C Hard Disk 34 will boot the computer system for user interaction.

When the user decides to initialize yet another operating system, in this case system three, he will turn the Key Switch 20 to position 3 and press the Reset Button 31 on the front of the computer system. AGND is then applied via position 3 of the Key Switch 20 to Relay Three on the I.O.S. Circuit Board 21. Again because the power to the computer is still on, Relay Three on the I.O.S. Circuit Board 21 is energized. When Relay Three of the I.O.S. Circuit Board 21 is energized and the System Three Switching Circuit is activated by applying +5 V to the Control line from contact A of Relay Three. System Three Switching Circuit makes connection between the Hard Disk Controller Card 9 and the System Three C Hard Disk 36 and System Three D Hard Disk 37, (optional). +5 V is also supplied via Relay Three contact A to a connector on the I.O.S. Circuit Board 21 marked: Power to System Three. A cable runs from this connector to the System Three C Hard Disk 36 and System Three D Hard Disk 37, (optional). +12 V is supplied thru Relay Three contact B to the Power to System Three connector. The initialization process can then take place and boot information and the operating system from System Three C Hard Disk 36 will boot the computer system for user interaction.

If the user decides to terminate use of the computer system and selects the OFF position of Key Switch 20, the systems are all electrically disconnected and all relays on the I.O.S. Circuit Board 21 de-energized. Without the key of Key Switch 20 no one may access any of the operating systems. If the user, when terminating use of the computer system, decides to leave the Key Switch 20 in one of the operating system positions, example position 2, and removes the key from the Key Switch 20, anyone using the system may only use system two operating system and not the other systems which are electrically disconnected.

When the computer system is turned off, no matter what position the Key Switch 20 is in, all the system C and optional D hard disks are electrically disconnected and can not be affected by AC line voltage fluctuations or power spikes, thus ensuring data integrity.

Figure 4:
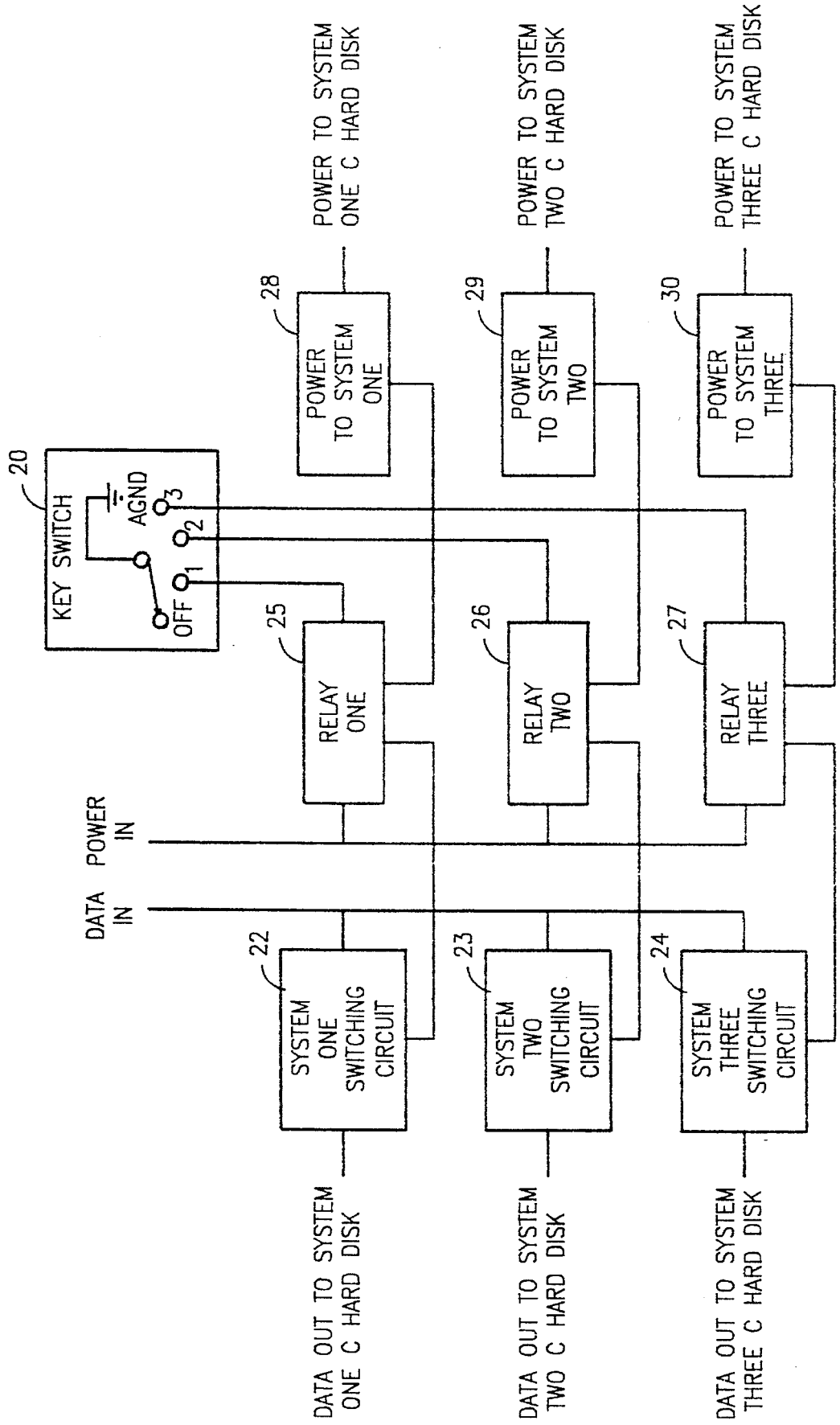
FIG. 4 is a flow chart of the I.O.S. circuit board and its functions.

FIG. 4 illustrates the I.O.S. circuit board and its basic functions. Items 22 thru 30 represent the I.O.S. Circuit Board 21 in FIG. 2 and FIG. 3.

The Key Switch 20 in the off position supplies no signal to Relay One 25, Relay Two 26 or Relay Three 27 thereby not energizing any of the relays or switching circuits. In this condition, the system hard disks are all isolated electrically and no interaction can take place between the system hard disks and the user. With the Key Switch 20 in position 1, Relay One 25 is energized and sends power to the system one C hard disk via a Power To System One 28 connector. Relay One 25 also supplies a control signal to System One Switching Circuit 22 which allows the Data In to connect to the Data Out To System One C Hard Disk.

With the Key Switch 20 in position 2, Relay Two 26 is energized and sends power to the system two C hard disk via a Power to System Two 29 connector. Relay Two also supplies a control signal to System Two Switching Circuit 23 which allows the Data In to connect to the Data Out To System Two C Hard Disk.

With the Key Switch 20 in position 3, Relay Three 27 is energized and sends power to the system three C hard disk via a Power to System Three 30 connector. Relay Three also supplies a control signal to System Three Switching Circuit 24 which allows the Data In to connect to the Data Out To System Three C Hard Disk.

While the system has been described with reference to the above configuration and electrical circuitry, it will be understood by those skilled in the art that many changes in form and detail may be made without departing from the original concept and scope of the invention.

What is claimed is:

1. Coupling means for connecting a personal computer, including startup means and a data storage device controller, to a plurality of bootable data storage devices, comprising:

first circuit means for connecting data lines from the data storage device controller to the coupling means;

second circuit means for connecting data lines from the plurality of bootable data storage devices to the coupling means;

switching means for connecting the data lines of a selected one of the plurality of data storage devices to the data lines of the data storage device controller through the first and second circuit means; and actuating means operable by a user for actuating the switching means, thereby connecting the data lines of the selected one of the data storage devices to the data lines of the data storage device controller, the startup means configuring the computer for the selected one of the data storage devices, upon initiation of a boot sequence initiated after the connection of the data lines of the selected one of the data storage devices to the data lines of the data storage device controller.

2. Coupling means according to claim 1 wherein the actuating means comprises a key switch having a plurality of positions for selecting respective ones of the plurality of data storage devices, the key switch including a removable key.

3. Coupling means according to claim 2 wherein the key is removable when the key switch is in any one of the plurality of positions.

4. Coupling means according to claim 3 wherein the key switch, in one of the plurality of positions, operates to disconnect all of the plurality of data storage devices from the data storage device controller.

5. Coupling means according to claim 4 wherein the first circuit means further comprises means for connecting power lines from the computer to the coupling means;

the second circuit means further comprises means for connecting power lines from the plurality of bootable data storage devices to the coupling means; and the switching means further comprises means for connecting the power lines of a selected one of the plurality of data storage devices to the power lines of the computer through the first and second circuit means.

6. Coupling means according to claim 5 wherein the switching means comprises:

a plurality of relays selectable by the key switch for connecting the power lines from the computer to power lines of the selected one of the plurality of data storage devices through the first and second circuit means; and a plurality of electronic switching circuits selectable by the key switch for switching the data lines from the hard disc controller to the data lines of the selected one of the plurality of data storage devices through the first and second circuit means.

7. Coupling means for connecting a personal computer, including stamp means and a hard disk drive controller, to a plurality of bootable hard disk drives, comprising:

first circuit means for connecting data lines from the hard disk drive controller to the coupling means;

second circuit means for connecting data lines from the plurality of bootable hard disk drives to the coupling means;

switching means for connecting the data lines of a selected one of the plurality of hard disk drives to the data lines of the hard disk drive controller through the first and second circuit means; and actuating means operable by a user for actuating the switching means, thereby connecting the data lines of the selected one of the hard disk drives to the data lines of the hard disk drive controller, the startup means configuring the computer for the selected one of the hard disk drives, upon initiation of a boot sequence initiated after the connection of the data lines of the selected one of the hard disk drives to the data lines of the hard disk drive controller.

8. Coupling means according to claim 7 wherein the actuating means comprises a key switch having a plurality of positions for selecting respective ones of the plurality of hard disk drives, the key switch including a removable key.

9. Coupling means according to claim 8 wherein the key is removable when the key switch is in any one of the plurality of positions.

10. Coupling means according to claim 9 wherein the key switch, in one of the plurality of positions, operates to disconnect all of the plurality of hard disk drives from the hard disk drive controller.

11. Coupling means according to claim 10 wherein the first circuit means further comprises means for connecting power lines from the computer to the coupling means;

the second circuit means further comprises means for connecting power lines from the plurality of bootable hard disk drives to the coupling means; and the switching means further comprises means for connecting the power lines of a selected one of the plurality of hard disk drives to the power lines of the computer through the first and second circuit means.

12. Coupling means according to claim 11 wherein the switching means comprises: a plurality of relays selectable by the key switch for connecting the power lines from the computer to power lines of the selected one of the plurality of hard disk drives through the first and second circuit means; and a plurality of electronic switching circuits selectable by the key switch for switching the data lines from the hard disc controller to the data lines of selected one of the plurality of hard disk drives through the first and second circuit means.

* * * * *